June 9, 1931.  C. TWEEDIE  1,809,364
ART OF MAKING SHOES
Filed Oct. 8, 1927   2 Sheets-Sheet 2
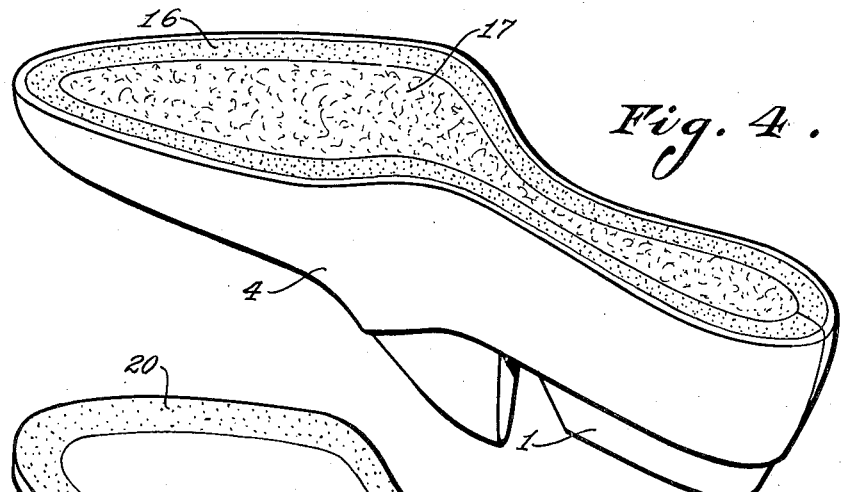
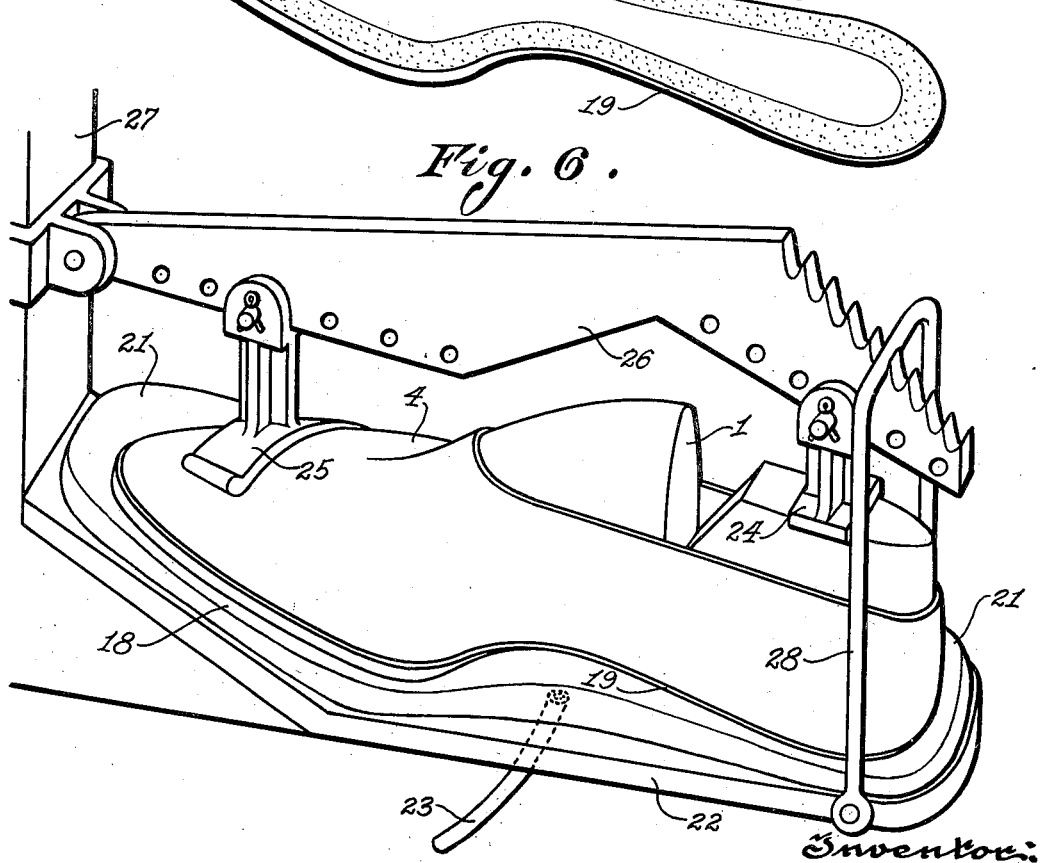
Inventor:
CHARLES TWEEDIE,
By John N. Bruninga
His Attorney.

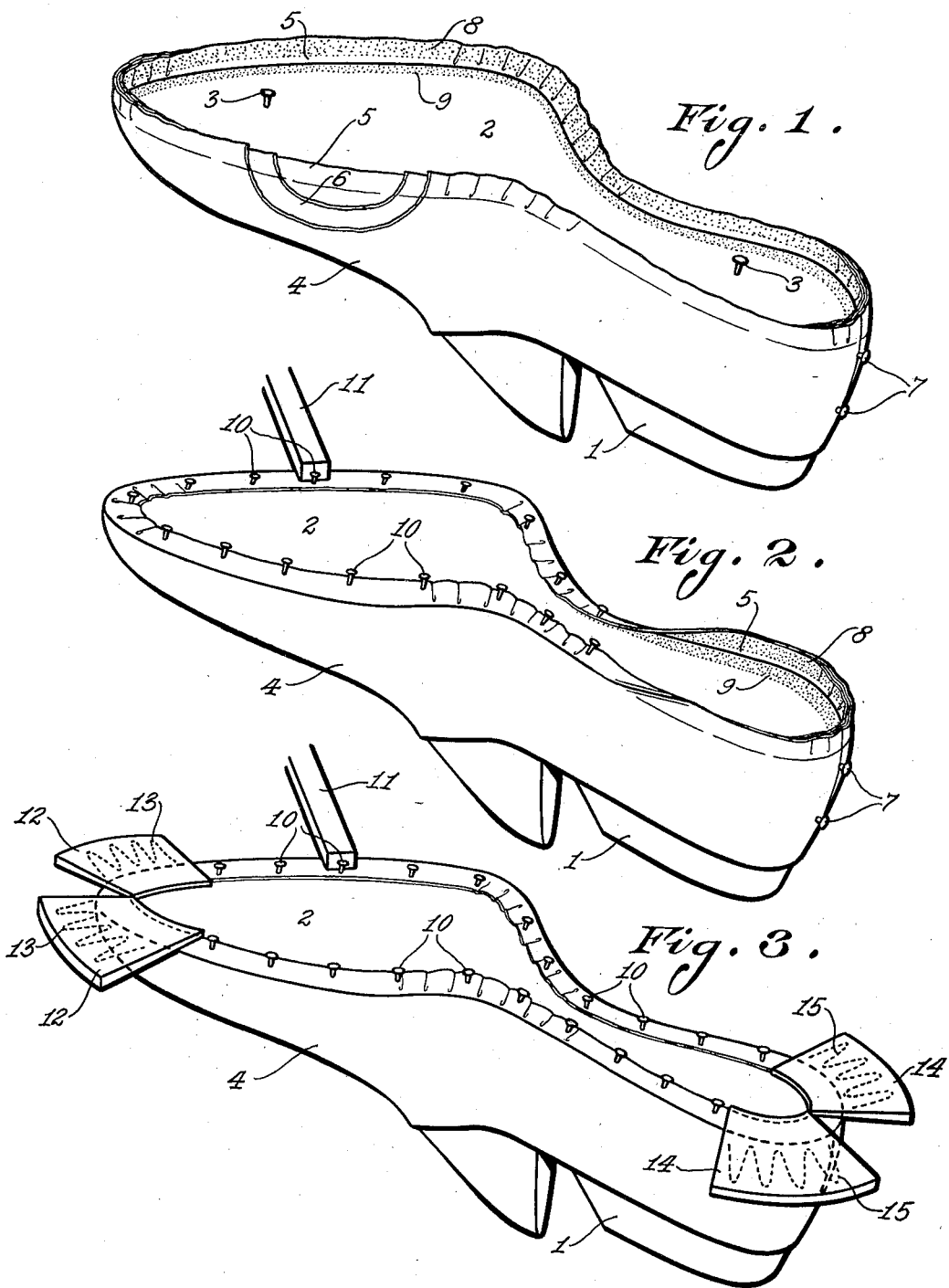

Patented June 9, 1931

1,809,364

UNITED STATES PATENT OFFICE

CHARLES TWEEDIE, OF JEFFERSON CITY, MISSOURI, ASSIGNOR TO HIMSELF AS TRUSTEE

ART OF MAKING SHOES

Application filed October 8, 1927. Serial No. 224,813.

This invention relates to the manufacture of boots and shoes, and more particularly to that type in which the sole and the upper are secured together by cementing.

In the manufacture of shoes of the type referred to, the upper (including its lining and doubler) is lasted over the insole and cemented thereto; after drying, the turned over margins of the upper are roughened to take the cement and the outsole is cemented to the lasted upper. The cement employed has a nitro-cellulose base and is of a quick drying type well known to the trade; this cement has the property of seting and drying rapidly, it can, however, be softened by a softening medium which is nitro-cellulose solvent, also well known to the trade as "B-solution".

In the manufacture of such a shoe, after the upper, (including its lining and doubler) has been lasted over the insole and secure by lasting tacks, cement is applied to the turned over margins; these turned over margins are then pounded or pressed down by any suitable tool while the lasting tacks are canted inwardly in order to closely conform the upper to the last. The shoe is then allowed to dry for a sufficient time to permit the cement to set and dry, which period varies from one to three hours. The tacks are then pulled, the inside margins of the upper trimmed, the turned over margins of the upper roughened, cement applied to these roughened margins, the bottom filled and the shank put in place. In applying the outsole to the upper so prepared, cement is usually applied to the inner face of the outsole along its margin after this margin has been suitably roughened; the cemented faces of the upper and of the outsole are then sprayed with a softening medium, the cemented faces placed together and the whole placed in a suitable press for applying the outsole. This press comprises an inflatable pad engaging the bottom of the outsole and air under pressure of about 40 pounds per square inch is delivered to the pad while the last is suitably supported in order to cause the air pressure to press the outsole against and conform it to the last. After a time sufficient to permit the cement to set, which is usually about thirty minutes, the shoe is removed from the press and finished in any suitable manner.

One of the objects of this invention is to improve the general process outlined above so as to facilitate the operations, reduce the time required in the individual operations and to improve the structure of the shoe itself.

One of the features of this invention resides in the fact that the margin of the upper (including its lining and doubler) is cemented prior to the lasting of the upper over the insole; the cement may be applied at any stage prior to the lasting, and even prior to assembling of the upper on the last.

Where the shoe has a leather lining, the grain side of the latter is usually on the inside, and the margin thereof takes the cement with difficulty; moreover, this lining margin provides an undesirable thickness especially at the heel seat. Another feature of this invention therefore resides in the fact that the margin of the lining is roughened or skived, preferably on the grain side, in order to more readily take the cement.

While the upper along the forepart, including the shank, may be readily cemented down on the insole, considerable difficulty is experienced in this respect at the ends of the shoe, and more particularly around the toe especially where a stiffener is used, on account of the puckering of the turned over margin of the upper. Another feature of this invention, therefore, resides in the fact that the lasted and cemented upper is subjected to the application of heat while it is held under tension due to the lasting in order to set the cemented upper. The heat can be and is, preferably, applied after lasting and cementing, to the toe part, while another part of the shoe such as the heel is being lasted.

Another feature of this invention resides in the fact that the outsole is formed to substantially finished shape before it is cemented and conformed to the upper and its last;

thus the outsole can be rounded, trimmed and even set either partly or wholly, and particularly along the shank, and the bottom thereof even finished prior to its application to the upper.

Further objects and features of this invention will appear from the detail description taken in connection with the accompanying drawings, illustrating one embodiment of this invention; it will be understood, however, that this invention is susceptible of various embodiments. In the accompanying drawings:

Fig. 1 is a perspective view showing the insole and assembled upper in position on the last;

Fig. 2 is a similar view showing the upper lasted and cemented along the forepart and shank;

Fig. 3 is a similar view showing the lasting and cementing of the toe part and the lasting of the heel part;

Fig. 4 is a similar view showing the upper cemented to the insole and with the margins of the upper roughened and cement applied;

Fig. 5 is a perspective view of the outsole ready for application to the lasted upper; and Fig. 6 is a perspective view showing the operation of laying and cementing the outsole on the upper.

Referring now to the accompanying drawings, and more particularly to Fig. 1, 1 designates a last on which is secured an insole 2 by temporary tacks 3 while the assembled upper 4, its lining 5 and doubler 6, are also secured by temporary tacks 7. The inside margin of the lining 5 is roughened and preferably skived as shown at 8, and this skiving may extend just around the heel or along the entire edge of the lining and on the grain side where this lining is of leather. This lining may comprehend the whole or part of the shoe while the doubler 6 usually comprehends the forepart only.

In accordance with this invention the margins of the upper (and also of the lining and doubler where used) are cemented. This cement may be applied at any stage prior to lasting; thus it may be applied prior to pulling over, or assembling, prior to or after sewing and immediately after dieing out of the parts; for the fact that the cement may dry prior to the lasting does not detract from the utility of this feature but rather enhances the same. The cement may, of course, be applied around the entire upper or around only a selected part or parts thereof. The insole may also have a coating of cement applied to its outsole face along the margin and this can be done either before or after the insole is tacked on the last; this cement can also be allowed to dry. As a practical illustration of one embodiment of this invention we can assume that the cement has been applied to the margins and has dried, so that when assembled, as shown in Fig. 1, the margins of the upper, lining and doubler will be dry and non-adhesive in that condition. We can also assume that cement has been applied to the margin of the insole as shown at 9.

After the upper has been assembled as shown in Fig. 1, it is pulled over the insole in accordance with any approved pulling-over operation or practice. The upper is then side lasted in any suitable manner, or by any suitable machine, so that the upper margins will be turned over the insole and temporarily secured (Fig. 2) by tacks 10. Both the pulling-over and lasting operations are not impeded due to the fact that the margins are not cemented together so that the layers can move freely relatively and over the last. The upper will then be conformed to the last and under tension due to the lasting, with the superposed margins of the upper, lining and doubler folded down on the insole. The cement softening medium is then sprayed against the inturned margins, and as this medium is very penetrating the cement applied to the margins will become softened and again adhesive. After the cement has thus become softened and adhesive, the operator will press or pound the folded over margins down on the insole while the tacks 10 are canted inwardly to carry the folded over margins inwardly, thereby tensioning the upper and causing it to conform closely to the last. This can be accomplished by any suitable tool, shown generally at 11, Fig. 2; indeed pressing, pounding and canting operations may be performed by a suitable mechanism and in a suitable machine.

The toe and heel lasting are preferably performed in a bed laster, as shown in Fig. 3, and these end lasting operations are preferably performed after the side lasting has been completed, although that is not essential. The cementing and pressing down of the upper along the forepart and shank, as well as the canting of the tacks 10, may also, if desired, be performed while the shoe is in a bed laster, as shown in Fig. 3.

The lasting of the forepart around the toe can be accomplished in a bed laster and by any suitable end lasting mechanism, as by wipers 12, shown generally in Fig. 3. The upper can be wiped over the toe in the usual manner, and if the margin of the upper around the toe has been pre-cemented the softening medium is sprayed against the margins in order to soften the cement and render it adhesive. Where, however, the upper has not been cemented around the toe, the wipers may be backed nearly to the last margins and cement applied to the layers of material, or this cement may be applied prior to wiping the upper over the last. After the upper has thus been wiped over the last around the toe and while it is held by the wipers and is under tension due to the wiping or lasting, heat is applied to the lasted upper so as to cause quick setting of the cement. This heat can be applied in any suitable manner; in accordance with one embodiment of this invention, electric resistances 13 may be arranged contiguous or even within the wipers or wiper carriers, so as to heat the same. These resistances are so designed as to raise the temperature of the upper to a sufficient extent, in accordance with the time the heat is applied to cause the cement to set so as to hold the upper in shape around the toe when the lasting means is removed. It will, of course, be understood that any other suitable means may be provided for applying heat to the upper to accomplish the desired result.

As the toe lasting operation is conveniently performed in a bed laster, the lasting of the heel can also be accomplished in the same machine; in fact the process is facilitated by following this procedure, for the reason that after lasting and cementing of the toe part, the heat can be applied to the cemented upper around the toe until and while the heel part is being lasted. The heal lasting can be performed in any suitable manner as by wipers 14 shown in Fig. 3, and this heel part need not necessarily be secured by cementing since the usual practice of securing the upper by permanent lasting tacks can be followed. Where, however, it is desired to also cement the heel, then substantially the same procedure can be followed as in the lasting and cementing of the toe part, and heat may also be applied to the lasted upper around the heel in any suitable manner and by any suitable means, as by electric resistances 15. Here also the application of the heat may be at a temperature and for a period sufficient to cause the cement to set sufficiently to hold the upper in place after the wipers are removed; during that period the softening medium may be applied to the forepart and shank, and the upper pressed or pounded down and the tacks canted over as previously described.

It will, of course, be understood that in the lasting of the toe part and heel part, the usual toe stiffener and counter may be employed and that the margins of the latter are suitably cemented either before or after assembling, or during lasting. It will also be seen that the fact that the lining margin has been skived or roughened enables the same to readily take the cement while the thickness of the material especially at the heel has been reduced.

After the upper has been cemented down as previously described, it is allowed to set and dry for the required period. The tacks 10 are then pulled, the turned over margins of the upper trimmed, the turned over margins of the upper roughened, a layer of cement applied as shown at 16, Fig. 4, a filling 17 of any suitable material applied and a shank (not shown) inserted. The upper is then ready for the application of the outsole.

The outsole 18 is generally shown in Fig. 5. It may be cut, rounded and partly or even wholly trimmed or set. Preferably, however, the margins are set simply at the shank as shown at 19. The bottom of the outsole may be finished; in fact it is one of the objects and features of this invention that the outsole be formed as close to its finished shape as possible in order to obviate as far as possible the heretofore necessary trimming and finishing operations after the sole is on the shoe. The inside face of the sole is on the shoe. The inside face of the outsole may also be roughened along the margin as shown at 20, and a layer of cement applied thereto.

The outsole is applied to the upper on the last in any suitable manner. As shown in Fig. 6, the application is through the medium of air pressure applied to a pneumatic pad 21, mounted on a support 22 and having an air connection 23, while the last 1 with the upper thereon is sustained against the air pressure by suitable heel and toe supports 24 and 25, mounted on an arm 26 pivoted on a base part 27 and connected with the support 22 by a link 28. It will, of course, be understood that Fig. 6 shows simply one of the many forms of devices capable of performing the sole laying process. In practice, the cement on the upper and outsole, if dry, is softened and rendered adhesive by the application of a softening medium, and the outsole is laid on the pad 21 with the lasted upper accurately located thereon. The air pressure is then applied to the pad in order to not only press the located sole against the upper on the last, but also to conform the sole to the last. The pressure is maintained until the cement has set. The shoe with the sole applied thereto can then be removed and finished in the usual manner.

It will, therefore, be seen that the invention accomplishes its objects. A process is provided whereby the various operations may be performed in a simple, convenient and expedious manner. The feature of pre-cementing the edges of the upper results in economy, in that these cementing operations may be performed conveniently and by cementing mechanisms even while the upper is over the last. The lasting operations can, therefore, be performed in the usual manner and without hindrance, for the laster is not required to apply any cement but simply the softening medium which can be readily accomplished. The feature of applying heat to the lasted upper, especially around the toe while it is held under tension due to the lasting, not only results in a saving of time, but permits the upper to be more readily conformed to the last. Moreover, the lasting operation is facilitated due to the fact that the heat can be applied to set the cement at the toe part while the heel part is being lasted. It will, of course, be understood that this feature is applicable to other parts of the shoe, since it is of advantage to last a part of the upper over the insole and apply heat to the upper part so lasted while another part of the upper is being lasted. The feature of roughening or skiving the margin of the lining not only permits this lining margin to readily take the cement but also reduces its thickness. The feature of pre-forming and finishing the outsole as much as possible, is of advantage because these finishing operations may be performed more readily on the sole before it is applied, because this can be done by machine, and, these operations are obviated after the sole is applied. In fact it is practical in accordance with this invention to deliver the shoe after the laying operation, in substantially finished form.

While the process has been shown and described as applied to a shoe of a particular type, namely, one having an insole and an outsole, it will be understood that the same is merely illustrative of one of the embodiments of this invention and not limitative; for this invention as far as method and procedure is concerned, is applicable in many cases to shoes of other forms and types. It will, furthermore, be understood that certain features, steps and sub-combinations are of utility, and may be employed without reference to other features and steps; that is contemplated by and is within the scope of the appended claims. It is furthermore, obvious that various changes may be made in the details of procedure, within the scope of the appended claims, without departing from the spirit of this invention. It is, therefore, to be understood that this invention is not to be limited to the details described and/or shown.

Having thus described the invention what is claimed is:

1. In the art of making shoes, the process comprising, applying cement to the margins of the upper, permitting the cement to harden, then lasting the upper over the insole in order to conform the upper to the last, softening the cement after such lasting, and sticking the cemented upper margin to the insole while it is held under tension and conformed to the last.

2. In the art of making shoes, the process comprising, applying cement to the margins of the upper and its lining, permitting the cement to harden, then lasting the upper and lining over the insole in order to conform the upper and lining to the last, softening the cement after such lasting, and sticking the cemented upper and lining margins to the insole while they are held under tension and conformed to the last.

3. In the art of making shoes, the process comprising, skiving the margin of the upper lining, applying cement to the margins of the upper and skived lining, permitting the cement to harden, then lasting the upper and lining over the insole in order to conform the upper and lining to the last, softening the cement after such lasting, and sticking the cemented upper and lining margins to the insole while they are held under tension and conformed to the last.

4. In the art of making shoes, the process comprising, applying a drying cement to the margins of the upper, lasting the cemented upper over the insole after the cement has dried and tacking the same, applying a cement softening medium to the cemented margins, pressing the same on the insole and canting the tacks, and removing the tacks after the cement sets.

5. In the art of making shoes, the process comprising, applying cement to the margin of the upper, permitting the cement to harden, then lasting the upper over the insole, softening the cement, sticking the upper to the insole, and then causing the cement to set by the application of heat to the lasted upper while it is held under tension by the lasting means.

6. In the art of making shoes, the process comprising, applying cement to the margin of the upper, permitting the cement to harden, then lasting the upper over the insole, around the toe, softening the cement, sticking the upper to the insole, and then causing the cement to set by the application of heat to the lasted upper while it is held under tension by the lasting means.

7. In the art of making shoes, the process comprising, applying cement to the margin of the upper, permitting the cement to harden, then wiping the upper over the insole in order to conform the upper to the last, softening the cement after such lasting, and sticking the cemented upper margin to the insole while it is held by wiping means.

8. In the art of making shoes, the process comprising, applying cement to the margin of the upper, permitting the cement to harden, then wiping the upper over the insole, softening the cement, sticking the upper to the insole, and then causing the cement to set by the application of heat to the lasted upper through the wiping means while the upper is held under tension by the wiping means.

9. In the art of making shoes, the process comprising, applying a drying cement to the margin of the upper around the toe, wiping the cemented upper over the insole after the cement has dried, applying a cement softening medium to the cemented upper, and applying heat to the cemented portion of the lasted upper while it is held by the wiping means.

10. In the art of making shoes, the process comprising, lasting a part of the upper over the insole and cementing the same thereto, lasting another part of the upper over the insole and cementing the same thereto, and applying heat to the first lasted and cemented part while the second part is being lasted and cemented.

11. In the art of making shoes, the process comprising, lasting a part of the upper over the insole, cementing the same thereto, holding the lasted and cemented part on the insole, lasting another part of the upper over the insole and cementing the same thereto, and applying heat to the first lasted and cemented part while held down on the insole and while the second part of the upper is being lasted and cemented.

12. In the art of making shoes, the process comprising, lasting the upper over the insole around the toe and cementing the same thereto, lasting and cementing another part of the upper around the heel, and applying heat to the lasted and cemented upper around the toe while the upper is being lasted and cemented around the heel.

13. In the art of making shoes, the process comprising, lasting the forepart over the shank and insole and cementing the same thereto, lasting the upper to the insole around the toe and cementing the same thereto, lasting the upper over the insole around the heel and cementing the same thereto, and applying heat to the cemented part of the upper around the toe while the upper is lasted and cemented around the heel.

In testimony whereof I affix my signature this 30th day of June, 1927.

CHARLES TWEEDIE.